Patented Aug. 20, 1929.

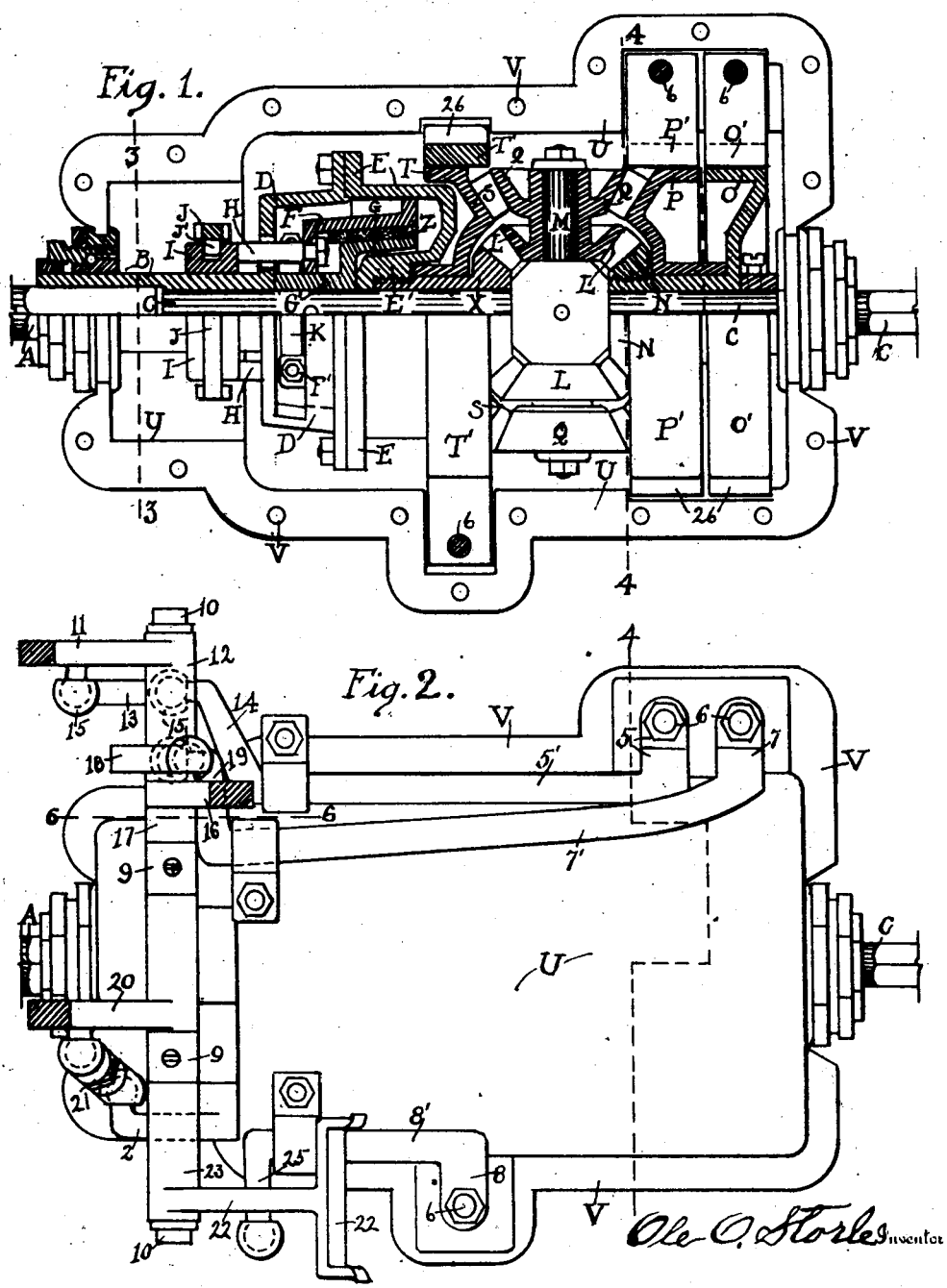

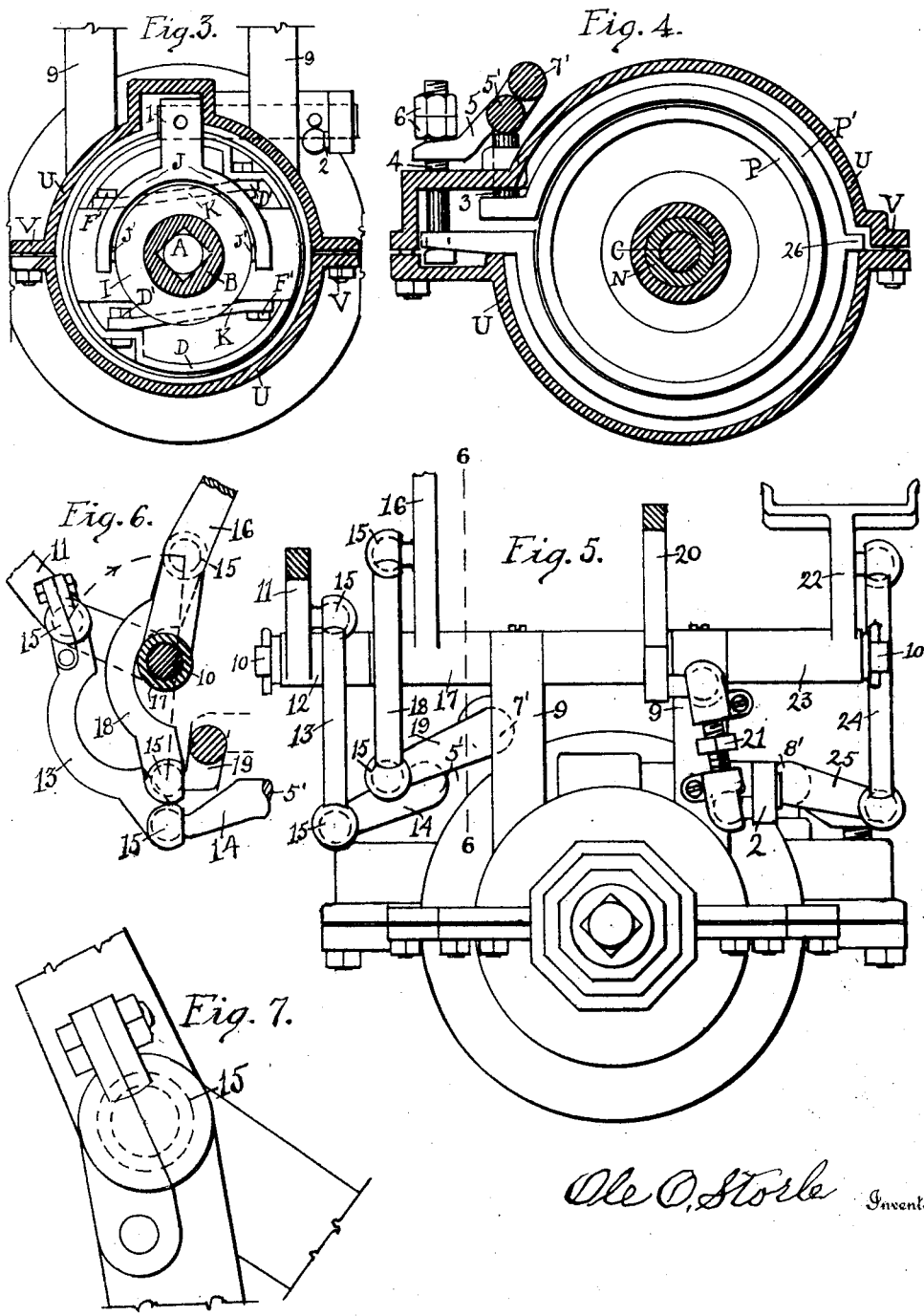

1,725,313

UNITED STATES PATENT OFFICE.

OLE O. STOBLE, OF TACOMA, WASHINGTON.

TRANSMISSION GEAR.

Application filed September 4, 1923. Serial No. 660,926.

My invention relates to improved means for operating transmission clutches and gears generally used in conjunction with automobiles and other motor driven vehicles. It pertains more particularly to improvements to my former Patent No. 1,416,074, dated May 16, 1922, and has for its object to improve certain features as hereinafter clearly described and then sought to be claimed.

I attain these objects by the mechanism illustrated in the accompanying drawings in which—

Figure 1 is a one-half horizontal section and a one-half top view of the transmission clutch and gears, showing the changes and improvements in my former patent, the entire mechanism being shown resting in the lower half of the lubricant chamber in which the same is inclosed; Fig. 2 is a top view of the exterior of the lubricant chamber and shows the improved clamping lever mechanism for operating the friction clutch and gears therein; Fig. 3 is a cross section on the line 3—3 of Fig. 1 looking to the right; Fig. 4 is a cross section on the line 4—4 of Fig. 1, and shows the newly invented means for setting the clamping brakes on each of the transmission gears; Fig. 5 is a front end view of Fig. 2 showing the position of the newly improved clamping levers; Fig. 6 is a side view of two of the levers looking to the left from the line 6—6 of Fig. 5; and Fig. 7 is an enlarged view of a ball-and-socket joint used on the several levers.

Similar characters refer to similar parts in the several views.

The engine or driving shaft A, has its end securely fixed within the sleeve B, and by this means rotary movement is imparted to the transmission clutch and gears and through them to the transmission shaft C, which is in alinement with the driving shaft A, substantially the same as in my former patent. It will be observed I have introduced a friction clutch instead of the engaging clutch shown in the patent. It will be seen I have extended the sleeve B into a bell-shaped extension D provided with a flange joint and further extension E whereby the same is continued to the sleeve of the gear X to which it is securely threaded at E'. Within the inclosure formed by this enlarged extension of sleeve B is the newly devised friction clutch comprising the cone-shaped friction base G with a sleeve G' encircling the shaft C and securely pinned thereon. Encircling this base is a shifting clutch member F with its lining Z made to fit thereto and to grip the base G when shifted to fit tightly thereon. It will be observed that the clutch member F receives its rotating force from the push and tension pins K—K bolted to and connecting D and F at D' and F' respectively. These pins K—K are more clearly shown in Fig. 3, and act the same as the corresponding pins shown in my former patent.

The construction and operation of the transmission gears shown herein are the same as in my former patent and the specification therein will describe them as shown in Fig. 1.

The friction clutch member F is operated by means of a yoke lever J with pins engaging a grooved collar I at J'—J'. This collar I has two extension bars H—H just back of the yoke pins extending to the face of the clutch member F and securely fixed thereto. The yoke lever J is pinned to a hinge-pin 1 on the opposite end of which is a lever 2 to be connected with an operating lever described later herein.

The brakes O', P' and T' designed to shift the transmission gears with my newly invented clamping levers are made as shown in Fig. 4. The clamping device comprises a push-pin 3 and a tension bolt 4 so operated by a lever 5 as to clamp each brake band tightly on its respective wheel. This lever 5 is so mounted on a shaft 5' that its heel rests centrally on pin 3. This shaft when turned to the right will bear down on pin 3 as a fulcrum and cause lever 5 to lift up on bolt 4 and thereby clamp the brake band P' on wheel P. The action of lever 5 is to be suitably adjusted by means of the lock nuts 6. The operation of brake band O' through lever 7 and shaft 7' and on brake band T' through lever 8 and shaft 8' is identically the same as described for brake band P', except with shaft 8' which is turned to the left instead of to the right. Each is designed to be operated separately by its respective clamping lever.

It is to be observed the new friction clutch and the three brake bands and wheels are all inclosed within the lubricant chamber U together with the gear mechanism.

The newly invented clamp levers are designed to be mounted on the top of the lubricant chamber U. Two upright posts 9—9 fixed thereon support a pivotal fulcrum rod 10, and on this the clamping levers are mounted and operated. The lever 11 with its cylindrical mounting 12 on rod 10 as a fulcrum, has a link 13 connecting it with a crank 14 on the forward end of shaft 5'. By this means brake band P' can be set on wheel P with its gears meshing with gear Q, causing the slow speed gear to operate as described in my former patent. The connecting link 13 has a ball and socket 15—15 on each end, the construction of which is more clearly shown in the enlarged Fig. 7.

Lever 16 with its fulcrum mounting 17 has its link 18 connected with crank 19 on shaft 7' which operates lever 7 and sets brake band O' on wheel O with its gears meshing with gear L which is the medium gear and thus operated as in my former patent. It will be observed in Figs. 5 and 6 that lever 11 is thrown forward setting brake P' free and lever 16 is drawn back and brake O' is set thereby. The two positions exhibit a novel feature of the clamp lever mechanism. The links 13 and 18 each have an arc-shaped body so as to partially encircle the fulcrum bearings 12 and 17 when the lever is drawn back as is lever 16 and the tension line between the ball and socket bearings 15—15 passes back of the center of the fulcrum rod 10 and the lever is thus automatically tension set as can be seen in Fig. 6. This does away with locking devices and simplifies the operation.

Lever 20 is mounted as are levers 11 and 16 and has it link 21 connected with lever 2 whereby the friction clutch member F, previously described is operated. A right and left screw nut turnbuckle in link 21 provides means for proper adjustment to lever 2. The lever is simply thrown forward to set the clutch and backward to free the same.

The pedal lever 22 with its fulcrum mounting 23 is designed to set brake band T' on wheel T with its gears meshing gear Q which causes gear Q to travel oppositely making the shaft C to reverse and back the car as in my former patent. The link 24 connected with crank 25 is to the rear of fulcrum mounting 23 owing to the forward action of the pedal lever 22 used at the will of the operator as necessity may require in backing his car.

With the friction clutch and clamping lever improvements, as shown and described, added to my former patent, I have a transmission clutch and gears that can be operated with ease, free of confusion and with no jar or ripping of cogs. All friction mechanism is inclosed within the lubricant chamber where it works noiselessly and is protected from dust and injury.

It will be observed the two parts of the lubricant chamber are mounted on the driving shaft with ball bearings and put together with a flange joint V. In the mechanism as described and shown, I do not limit myself to exact details but reserve the right to make such changes as will secure the best results in mechanical operation.

It is to be further noted that each brake band, P', Q' and T', has a projecting part 26 on the opposite side from the clamping levers 5, 7 and 8 respectively, whereby each brake band is supported on the side of the lubricant chamber U, thus holding each brake band free from contact and wear on its respective brake wheel when not set thereon. It also allows each brake band to act free of the lubricant chamber when tightly set on its respective brake wheel. This is quite essential in the operation of the brake bands.

Having described my invention, I claim—

1. In a transmission gear, a driven-shaft, a sleeve attached to said shaft and formed with a cone-shaped friction member, a clutch member associated for cooperation with said cone-shaped member, a drive-shaft, a sleeve mounted on the drive shaft and formed with a bell-shaped extension with which said clutch member is flexibly connected, and means for shifting the clutch member into and out of frictional engagement with the cone-shaped friction member.

2. In a transmission gear, a driven-shaft, a sleeve attached to said shaft and formed with a cone-shaped friction member, a clutch member associated for cooperation with said cone-shaped member, a drive shaft, a sleeve mounted on the drive-shaft and formed with a bell-shaped extension, plural swinging links pivotally connected with said bell-shaped extension and with said clutch member, and means for shifting the clutch member into and out of frictional engagement with the cone-shaped friction member.

3. In a transmission gear, a driven-shaft, a sleeve attached to said shaft and formed with a cone-shaped friction member, a clutch member associated coöperatively with said cone-shaped member, a drive-shaft, a sleeve mounted on the drive-shaft and formed with a bell-shaped extension, plural swinging links pivotally connected with said bell-shaped extension and with said clutch member, a collar loosely mounted on the bell-shaped extension sleeve, bars connecting said collar and clutch member, and means for moving said collar to frictionally engage and disengage the cooperating clutch members.

4. In a transmission-gear, a driven shaft, a sleeve attached to said shaft and provided with a friction clutch member, a driving shaft provided with a friction clutch member disposed to cooperate with the friction clutch member of the driven shaft, a sleeve attached to the driving shaft and formed with a bell-shaped extension and means connecting said bell-shaped extension with the driven shaft for operating the same.

In testimony whereof I affix my signature.

OLE O. STORLE.